United States Patent [19]
Kanno et al.

[11] 3,718,479
[45] Feb. 27, 1973

[54] METHOD FOR MANUFACTURE OF PROCESSED FOODS FROM SOYBEANS

[75] Inventors: Tomoei Kanno, Chibaken; Harunobu Kobayashi, Tokyo, both of Japan

[73] Assignee: Showa Sangyo Kabushiki Kaisha, Tokyo, Japan

[22] Filed: June 2, 1970

[21] Appl. No.: 42,863

[52] U.S. Cl. ...........................................99/17, 99/99
[51] Int. Cl. ...............................................A23l 1/20
[58] Field of Search.........................99/98, 99, 17, 64

[56] References Cited

UNITED STATES PATENTS

| | | | |
|---|---|---|---|
| 2,052,215 | 8/1936 | Cohn | 99/99 |
| 3,585,047 | 6/1971 | Fujimaki et al. | 99/99 |

FOREIGN PATENTS OR APPLICATIONS

| | | | |
|---|---|---|---|
| 478,570 | 1/1938 | Great Britain | 99/17 |

*Primary Examiner*—A. Louis Monacell
*Assistant Examiner*—J. M. Hunter
*Attorney*—Holman and Stern

[57] ABSTRACT

Treating soybeans for use in processed foods, by submerging whole soybeans in water containing 0.1 to 0.5% of sulfurous acid and mother starter of lactic acid bacteria, crushing, skinning, and steaming said soybeans, and subjecting said soybeans to fermentation by inoculating a culture of microorganisms possessing proteolytic and soybean cotyledon cell macerating activity and then drying and pulverizing said soybeans.

6 Claims, No Drawings

METHOD FOR MANUFACTURE OF PROCESSED FOODS FROM SOYBEANS

This invention relates to processed foods, and more particularly to a method of making processed foods from soybeans.

The primary object of the present invention is to manufacture processed foods from soybeans without bitter taste and off flavor.

Another object of the present invention is to provide a raw material, which can be used in numerous processed foods from soybeans economically.

Soybean milk is a drink made from soybeans and, because of its low cost of production, good digestibility and high nutrition, it is widely used in such areas as Hong Kong, Formosa, and Southeast Asia. But in Japan, countries of Europe and the United States of America, the use of soybean milk is limited to special purposes such as a milk substitute for milk allergic infants, religious vegetarians, and patients under dietary treatments.

There have been attempts to produce numerous foods from defatted soybeans, but successful applications can only be found in the manufacture of soybean paste (miso), soybean sauce, tofu (soybean curd), and are remarkably rare compared with milk products. The first reason for this is the bitter taste and off of soybeans and soybean products.

Another reason which may be cited is that economical mass production has not been possible for soybean milk.

Therefore, to promote industries for the manufacture of processed foods from soybeans, it is necessary not only to remove the bitter taste and off flavor of soybeans but to develop an economical method of treatment suitable for mass production of the material.

The process of the present invention is illustrated as follows;

Soybeans → Selection (removing of foreign materials)
→ immersion in water Sulfurous acid vapor Inoculation of Lactic acid bacteria
Immersion in sulfuric acid solution Lactic acid fermentation Removal of water
Crushing → Heating by steaming → Grinding
Inoculation of microorganisms Fermentation (Water content about 60 percent)
neutralization Drying under vacuum condition →
Pulverization → Product.

As shown in the foregoing flow description, one of the main characteristics of the present invention is that immersion of soybeans in sulfurous acid solution and lactic acid fermentation are carried out simultaneously, such a process hitherto has never been practiced.

By carrying out the above treatment the removal of the taste and off flavor components of raw soybeans can effectively be accomplished. These effects are increased by the fermentation step, followed by inoculation of microorganisms. The product thus obtained has excellent flavor and is entirely free of bitter taste and off flavor.

By blowing sulfurous acid gas into the water in which soybeans are immersed, the pH value of the water comes to nearly the isoelectric point of soybean protein, and reduction of the yield of the product by the soybean protein into the water can be avoided.

The fermentation by inoculation of microorganisms can be carried out in the pasty medium, water content of which is about 60 percent. The drying of the product can then be carried out more economically compared with usual soybean milk (water content of which is about 90 percent) production.

The characteristics of the present invention are as follows:

1. Immersion of soybeans in sulfurous acid solution

This step may be performed under substantially the same conditions as the wet process of corn starch production. But in the corn starch production, immersion in the sulfurous acid solution is intended primarily for the separation of starch making up about 70 percent in corn grain. Whereas, the object of the process of the present invention is entirely different from the process of the corn starch production. (The starch content of soybean is less than 0.1 percent contained in the cotyledon).

The object of immersing the soybeans in sulfurous acid solution is to soften and to collapse the bonds of the protein body and spherosome granule in the colyledon cells of the soybeans and to remove the substances contained in them, such as weak acids, soluble sugars, non-proteinous nitrogen compounds, off flavor substances and most of the water soluble physiological inhibitors.

By inoculating the mother starter of sulfurous acid resistive lactic-acid bacteria (for example, Lactobacillus delbruckii) in the immersion solution, lactic-acid is produced in the immersion solution. The cotyledon cells, which absorb moisture and swell, are subjected to softening and collapsing action of the sulfurous acid, and lactic acid.

2. Heating by steam

The object of this step is to increase the effect of the above step (1), and to inactivate the physiological inhibitors such as urease and trypsin inhibitor, and enzymes such as lipoxidase.

Lipoxidase acts on lipid in soybeans during its pulverization and forms a large amount of peroxide which is considered to be a source of off flavor in the soybeans.

In the method of the present invention, soybeans are pulverized after the inactivation of lipoxidase, thereby avoiding the formation of off flavor.

3. Fermentation

This step is characterized by inoculating a culture of microorganisms, having the remarkable proteolytic activities and macerating activities of cotyledon cells, to the medium containing soybeans treated by the steps shown in (1) and (2).

Microorganisms having the foregoing activities are *Neurospora sitophila, Aspergillus niger, Rhizopus niveus,* and *Bacillus subtilis,* which are commonly available.

The macerating activities of microorganisms can be tested by the following method;

Soaking skinned soybeans in water, steaming said skinned soybeans for 30 minutes, crushing said steamed soybeans coarsely, inoculating said soybeans with 10 times (in weight) of a culture of microorganisms, shaking for one hour under 30°C, and observing whether said microorganisms have macerated said soybeans until the original form of said soybeans disappears completely or not.

In the method of the present invention, the protein of soybeans is slightly macerated by soaking soybeans in sulfurous acid solution, in which lactic acid bacteria were inoculated, and then by incubating microorganisms which retain protease of high activity and high macerating activity, the components of soybeans are subjected to complicated enzymatic decomposition. Off flavor material contained in cotyledon cells can completely be decomposed and owing to polypeptides which are formed by the slight decomposition of high molecular protein, a fair seasoning effect can be expected.

By the process of the present invention, a product of good flavor, which entirely differs from usual soybean milk and processed soybean products, can be obtained.

Example 1

100 parts of selected soybeans are washed with water, and are soaked for 24 hours at 55°C in water to which 0.5 percent of sulfurous acid and mother starter of lactic acid bacteria (for example *Lactobacillus delbrukii*) have been added.

After dehydration, the soybeans are coarsely crushed, washed with water, skinned, and steamed at 100°C for 5 minutes. Soybeans thus treated are ground into paste by a chopper.

To this paste thus obtained, 5 parts of culture of Neurospora Sitophila are inoculated, and the mixture is fermented for 4 hours at 30°C. After this fermentation, the fermented material is neutralized, dried under a vacuum of 10 mm Hg. at 40°C, pulverized, and 80 parts of powdered soybean milk product (moisture content 8 percent) of less than 40 mesh is obtained.

This product retains a mild and delicious flavor, without bitter taste and off flavor.

Example 2

The fermentation is carried out as described in Example 1, inoculating with Bacillus subtilis instead of Neurospora sitophila, piling inoculated material, and incubating at 45°C for 3 hours.

The fermented material is pulverized and 80 parts of the pulverized product for soybean milk (moisture content 8 percent) is obtained.

Using the products obtained by the process described in Examples 1 and 2, and three commercial powdered soybean milk products, samples of soybean milk are prepared according to the following prescriptions. The organoleptic tests by a panel of 30 members in accordance with the Kramer's Sensory Test are carried out with the samples of soybean milk at 20°C.

By these tests, it was found that the products according to Examples 1 and 2 were more favored than the commercial products, with a 5% level of significance.

Prescription

| | |
|---|---|
| Pulverized soybean products | 400 g |
| Salt | 0.5 g |
| Sugar | 10 g |
| Water | 600 ml |
| Boiling | 2 minutes |

The product of the present invention is suitable not only for materials for soybean milk but also for materials for various pasty foods, noodles, breads and cakes,

What we claim:

1. A method for the manufacture of a material of processed foods from soybeans, comprising the steps of submerging whole soybeans in water containing 0.1 to 0.5 percent of sulfurous acid and mother starter of lactic acid bacteria, crushing, skinning, and steaming said soybeans, subjecting said soybeans to fermentation by inoculating a culture of microorganisms possessing proteolytic and soybean cotyledon cells macerating activity, said microorganisms being selected from the group consisting of *Neurospora sitophila*, *Aspergillus niger*, *Rhizopus niveus*, and *Bacillus subtilis*, and then drying and pulverizing said soybeans.

2. A method for the manufacture of a material of processed foods as claimed in claim 1, wherein lactic acid bacteria inoculated as a mother starter is *Lactobacillus delbrukii*.

3. A method for the manufacture of a material or processed foods as claimed in claim 1, further comprising pasting the soybeans prior to fermentation.

4. A method for the manufacture of a material of processed foods as claimed in claim 1, further comprising coarsely crushing the soybeans prior to fermentation.

5. A method for the manufacture of a material of processed foods as claimed in claim 1, wherein the submerging step of the whole soybeans in water is carried out for 24 hours at 55°C.

6. A method for the manufacture of a material of processed foods, as claimed in claim 1, wherein the fermentation step by inoculating a culture of microorganisms is carried out for 3 or 4 hours at 45° or 30°C respectively.

* * * * *